United States Patent [19]

Inakura et al.

[11] 3,971,266
[45] July 27, 1976

[54] POWER TRANSMISSION DEVICE

[75] Inventors: Tuneho Inakura, Kariya; Masayuki Doi, Tokyo, both of Japan

[73] Assignee: Nippondenso Co., Ltd., Kariya, Japan

[22] Filed: July 16, 1974

[21] Appl. No.: 489,037

[30] Foreign Application Priority Data
July 17, 1973 Japan.................................. 48-81985
July 20, 1973 Japan.................................. 48-81479

[52] U.S. Cl. ................................................ 74/675
[51] Int. Cl.² ........................................ F16H 37/06
[58] Field of Search............................ 74/675, 679

[56] References Cited
UNITED STATES PATENTS

| | | |
|---|---|---|
| 3,013,519 | 12/1961 | Wiggermann........................ 74/675 |
| 3,027,779 | 4/1962 | McNaney............................. 74/679 |
| 3,190,147 | 6/1965 | Livingston .......................... 74/679 |
| 3,306,128 | 2/1967 | Zuse ..................................... 74/679 |

Primary Examiner—Benjamin W. Wyche
Assistant Examiner—Wesley S. Ratliff, Jr.
Attorney, Agent, or Firm—Cushman, Darby & Cushman

[57] ABSTRACT

A power transmission device comprises a plurality of driving shafts, a driven shaft, and a plurality of epicyclic differential gearings, therebetween, whereby each rotation of the driving shafts are independently transmitted to the driven shaft at the same time.

16 Claims, 5 Drawing Figures

Industrial Manipulator

POWER TRANSMISSION DEVICE

The present invention relates to a power transmission device used in an industrial manipulator as one part thereof, and especially to a power transmission device in which each rotation of a plurality of driving shafts is independently transmitted to a driven shaft.

In a conventional power transmission device of this kind, each rotation of a plurality of driving shafts can not be transmitted to a driven shaft without interference with one another.

Although another conventional device for the specific purpose can transmit two independent rotations without interfering each other, it is composed of a lot of cylinders and cams, with a resultant complex and bulky construction and high cost. Further conventional device also can transmit two independent rotations separately, however since this transmission is performed by controlling the each rotating direction separately, simultaneous transmission may not be achieved.

It is therefore a primary object of the present invention to provide a power transmission device of simple construction which can transmit each rotation of plural driving shafts simultaneously to a driven shaft without interference.

It is another object of the present invention to provide an improved smaller power transmission device.

Figure 1:
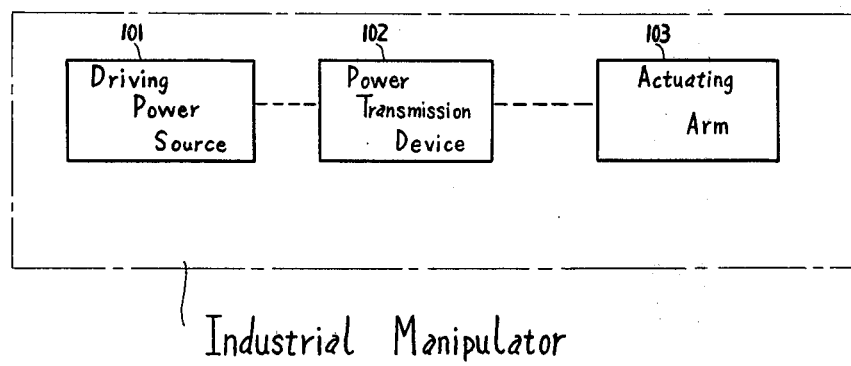
Figure 2A:
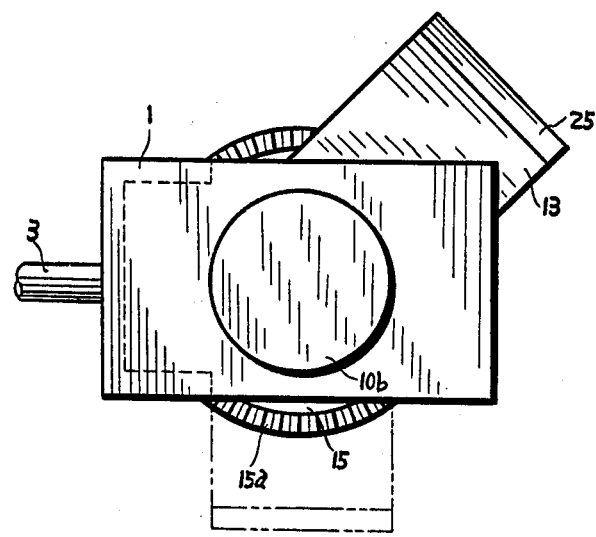
Figure 2B:
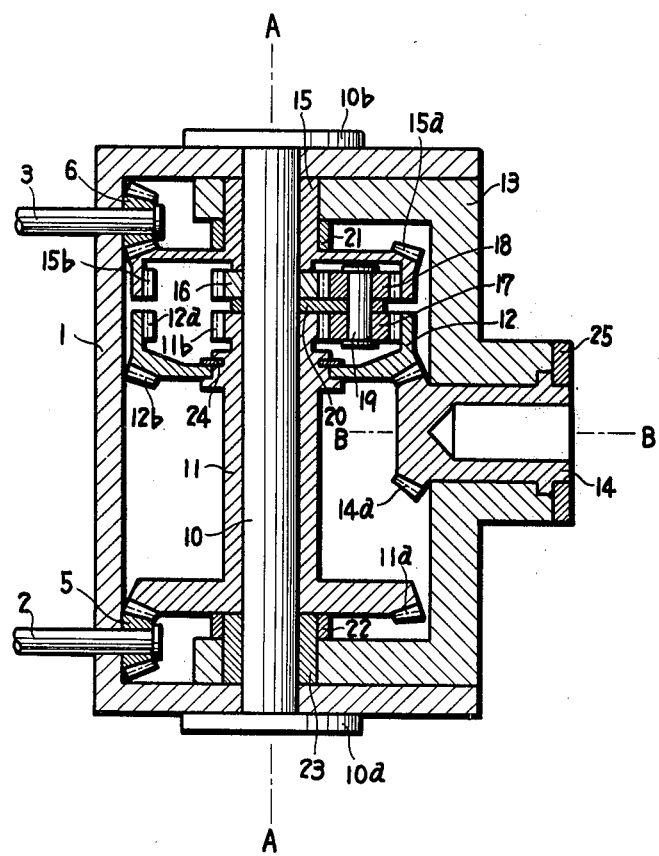
Figure 3A:
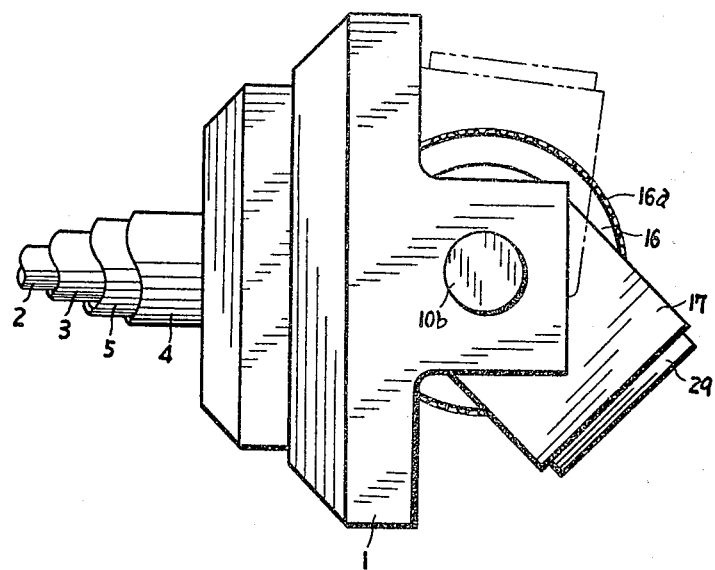
Figure 3B:
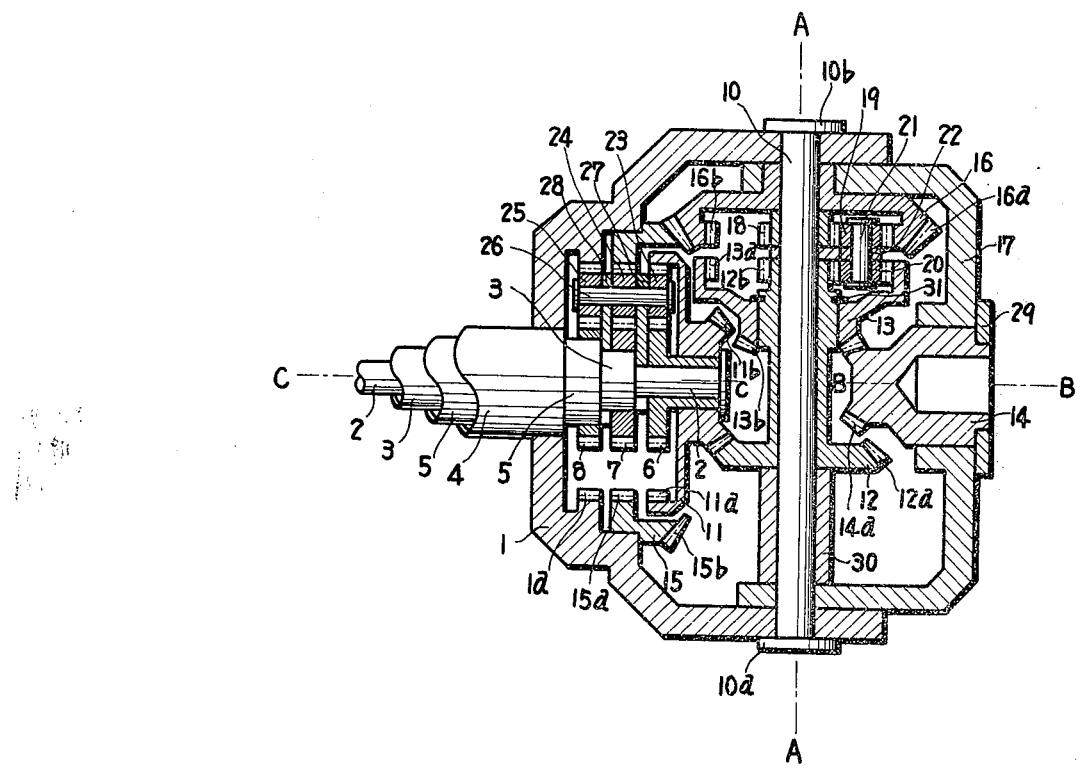

Other objects and advantages will be apparent from the ensuing specification and drawings, in which FIG. 1 is a block diagram showing relation among main parts of an industrial manipulator, FIG. 2A is an elevational view of the first embodiment of the present invention, FIG. 2B is a longitudinal sectional view of the embodiment in FIG. 2A, FIG. 3A is an elevational view of the second embodiment of the present invention, and FIG. 3B is a longitudinal sectional veiw of the embodiment in FIG. 3A.

Referring first to FIG. 1 showing the relationship among parts of an industrial manipulator, which mainly comprises a driving power source 101 generally employing a hydraulic motor, a power transmission device 102 connected thereto which will be described in detail hereinafter, and an actuating arm 103 connected to the power transmission device and employing, for example, an electromagnet.

Referring now to FIGS. 2A and 2B showing the first embodiment of the present invention, numeral 1 designates a main body, 2 and 3 a first and second driving shaft rotatably mounted on said main body. The first and second driving shaft 2 and 3 are respectively operated by the hydraulic motors in the driving power source. A bevel gear 5 is fixed to the first driving shaft 2 by means of a pin (not shown) so as to rotate therewith as one body. A bevel gear 6 is also fixed to the second driving shaft 3 in the same manner as the gear 5. A supporting shaft 10 is fixed to the main body 1 by fixing plates 10a and 10b at right angles with respect to the driving shafts 2 and 3. A first gear 11 which has at its one end a bevel gear 11a which engages with the bevel gear 5 and a spur gear 11b at the other end is rotatably supported on the supporting shaft 10. A second gear 12 which is provided with an internal gear 12a and a bevel gear 12b is rotatably and coaxially supported on the first gear 11. The bevel gear 12b engages with a bevel gear 14a provided on a driven shaft 14 which is rotatably mounted in a housing 13. The driven shaft 14 is connected to the actuating arm 103 and disposed at right angles with the supporting shaft 10. A third gear 15 has an internal gear 15b with the same diametral pitch and pitch-diameter as the internal gear 12a, and a bevel gear 15a which engages with the bevel gear 6 of the second driving shaft 3. The third gear 15 is rotatably carried by the supporting shaft 10 and also is so fixed to the housing 13 with a key (not shown) as to rotate therewith as one body by a range of almost 180°. A spur gear 16 is fixed to the supporting shaft 10 with a key (not shown) and has the same diametral pitch and pitch-diameter as that of the spur gear 11b. Pinions 17 and 18 are rotatably supported on a pin 19, which is fixed to a stay 20 rotatably carried by the supporting shaft 10. The pinion 17 engages with both the internal gear 12a and the spur gear 11b, and the pinion 18 engages with both the internal gear 15b and the spur gear 16. Numerals 21, 22 and 23 designate spacers for positioning those gears, 24 a fixing element for fixing the second gear 12 rotatably to the first gear 11, and 25 a fixing element for fixing the driven shaft 14 rotatably to the housing 13.

The spur gear 11b of the first gear 11, the second gear and the pinion 17 constitute a first epicyclic differential gearing, and the internal gear 15b of the third gear 15, the spur gear 16 and the pinion 18 constitute a second epicyclic differential gearing.

The operation of the first embodiment as constructed above will now be described. A turning effort of the first driving shaft 2 is transmitted to the driven shaft 14 through the bevel gear 5, the bevel gear 11a, the spur gear 11b, the pinion 17, the internal gear 12a, the bevel gear 12b and the bevel gear 14a of the driven shaft 14, thereby to rotate the driven shaft 14 around an axis B—B independent of the rotation of the second driving shaft 3. On the other hand, a turning effort of the second driving shaft 3 is transmitted to the housing 13 through the bevel gear 6 and the bevel gear 15a of the third gear 15 which is fixed to the housing 13, thereby to rotate the housing 13 around an axis A—A, independent of the rotation of the first driving shaft 2.

Accordingly the driven shaft 14 is rotated together with the housing 13 around the axis A—A being independent of the rotation of the first driving shaft 2, in other words the driven shaft 14 is not rotated around the axis B—B even though the driven shaft 14 is rotated around the axis A—A, so far as the first driving shaft 2 does not rotate.

The detailed operation in this respect will be described hereinafter. For this purpose, at first, it is assumed that the bevel gear 12b of the second gear 12 is fixed to the first gear 11. When the second driving shaft 3 rotates and the first driving shaft 2 does not rotate, the third gear 15 is rotated around the axis A—A to rotate the housing 13 therearound as described before, the second gear 12 is not rotated because of no rotation of the first driving shaft 2, whereby the driven shaft 14 is rotated around the axis B—B as it is rotated around the axis A—A, because the rotation around the axis A—A causes the rotation around the axis B—B through the engagement between the bevel gear 14a of the driven shaft 14 and the bevel gear 12b of the second gear 12, depending on a relative movement therebetween.

However, in this invention, the second gear 12 is not fixed to the first gear shaft but rotatably supported thereon as described before. Therefore, when the third gear 15 is rotated by a certain angle the second gear 12 is synchronously rotated by the same angle as that of the third gear 15 through the second epicyclic differential gearing of the internal gear 15b, the spur gear 16 and the pinion 18 and the first epicyclic differential gearing of the spur gear 11b, the internal gear 12a and the pinion 17. If the gear 11b is rotated by the pinion 17, the second gear 12 is not synchronously rotated by the same angle as that of the housing 13 and further, an interference against the rotation of the driving gear 2 takes place. Accordingly the second gear 12 is synchronously rotated by the same angle as that of the housing 13 to eliminate the relative movement between the second gear 12 and the driven shaft 14, whereby the driven sbaft 14 is not rotated around the axis B—B even though it is rotated around the axis A—A.

In the above operation, the transmission of the turning efforts of both first and second driving shaft 2 and 3 is separately explained, however even when both driving shafts 2 and 3 rotate at the same time, the driven shaft 14 is rotated around the axis B—B irrespective of the rotation of the second driving shaft 3 and also around the axis A—A irrespective of the rotation of the first driving shaft 2.

Referring next to FIGS. 3A and 3B showing the second embodiment of the present invention, in which a first, second and third driving shaft 2, 3 and 4 are coaxial with and rotatable with one another. The third driving shaft 4 is fixed to a main body 1 to rotate the body 1 around an axis C—C. A fixing shaft 5 runs through the third driving shaft 4, and also the first and second driving shaft 2 and 3 respectively run through the second driving shaft 3 and the fixing shaft 5. The fixing shaft 5 is fixed to a housing or case for the driving power source 101 for holding the main body 1, and each of the driving shafts 2, 3 and 4 is respectively connected to hydraulic motors therein. A first, second and third spur gear 6, 7 and 8 are respectively fixed to the first driving shaft 2, and the second driving shaft 3 and the fixing shaft 5 by means of respective keys (not shown). A supporting shaft 10 is fixed to the main body by fixing plates 10a and 10b at right angles with the fixing shaft 5. A first gear 11 having an internal gear 11a at one end thereof and a bevel gear 11b at the other end is rotatably carried by the first spur gear 6. A second gear 12 having at one end a bevel gear 12a which engages with the bevel gear 11b and at the other end an internal gear 12b which engages with a second pinion 20 is rotatably carried by the supporting shaft 10. A third gear 13 having a spur gear 13a at one end thereof and, at the other end, a bevel gear 13b which engages with a bevel gear 14a provided on a driven shaft 14 is rotatably carried by the second gear 12. The driven shaft 14 is connected to the actuating arm. A fourth gear 15 having a spur gear 15a at one end thereof and a bevel gear 15b at the other end is mounted on the main body 1 so as to rotate around the axis C—C. A fifth gear 16 having a bevel gear 16a which engages with the bevel gear 15b and an internal gear 16b is carried by the supporting shaft 10 and fixed to a housing 17 by means of a key (not shown) to rotate therewith as one body by a range of 180°. A spur gear 18 carried by the supporting shaft 10 by means of a key (not shown) engages with a first pinion 19 which is rotatably carried by a first pin 21. The spur gear 12b has the same diametral pitch and pitch-diameter as that of the spur gear 18, and the internal gear 13a has the same diametral pitch and pitch-diameter as that of the internal gear 16b. The first pin 21 also carries the second pinion 20 and is fixed to a first stay 22 rotatably carried by the supporting shaft 10. The first pinion 19 engages with both the spur gear 18 which constitutes a sun gear and the internal gear 16b, and in like manner, the second pinion 20 engages with both the spur gear 12b which constitutes a sun gear and the internal gear 13a. An internal gear 1a is provided on an inner periphery of the main body 1. A third, fourth and fifth pinion 23, 24, and 25 are rotatably carried by a second pin 26 respectively, which is fixed to a second and third stay 27 and 28 respectively and rotatably carried by the first and second driving shaft 2 and 3. The first, second and third spur gear 6, 7 and 8 have the same diametral pitch and pitch-diameter with one another, and in like manner, the internal gears 1a, 15a and 11a have the same diametral pitch and pitch-diameter with one another. The third pinion 23 engages with both the first spur gear 6 which constitutes a sun gear and the internal gear 11a, the fourth pinion 24 with both said second spur gear 7 which constitutes a sun gear and the internal gear 15a, and further the fifth pinion 25 with both the third spur gear 8 which constitutes a sun gear and the internal gear 1a. A fixing element 29 holds the driven shaft 14 rotatably to the housing 17. Numeral 30 is a spacer, and 31 a fixing element for holding the third gear 13 rotatably on the second gear 12.

The fifth gear 16, the spur gear 18 and the first pinion 19 constitute a first epicyclic differential gearing, the spur gear 12b, the third gear 13 and the second pinion 20 a second epicyclic differential gearing, the first spur gear 6, the first gear 11 and the third pinion 23 a third epicyclic differential gearing, the second spur gear 7, the fourth gear 15 and the fourth pinion 24 a fourth epicyclic differential gearing, and the third spur gear 8, the internal gear 1a and the fifth pinion a fifth epicyclic gearing.

The operation of the second embodiment constructed above will now be described hereinafter. A turning effort of the first driving shaft 2 is transmitted to the driven shaft 14 to rotate it around the axis B—B through the first spur gear 6, the third pinion 23, the first gear 11, the second gear 12, the second pinion 20, the third gear 13, and the bevel gear 14a provided on the driven shaft 14. A turning effort of the second driving shaft 3 is transmitted to the housing 17 to rotate it around the axis A—A through the second spur gear 7, the fourth pinion 24, the fourth gear 15, and the fifth gear 16, whereby the housing 17 is rotated around the axis A—A together with the driven shaft 14.

When the second driving shaft 3 rotates the housing 17 around the axis A—A, the driven shaft 14 is not rotated around the axis B—B in the same manner as described in the first embodiment. When the fifth gear 16 is forced to rotate around the axis A—A with the housing 17 by the turning effort transmitted through the fourth pinion 24 and the fourth gear 15, the third gear 13 is forced to rotate synchronously around the axis A—A with the fifth gear 16 by the turning effort transmitted through the first pinion 19, the first pin 21 and the second pinion 20, namely through the first and second epicyclic differential gearing. A turning effort of the third driving shaft 4 is directly transmitted to the main body 1 so as to rotate the driven shaft 14 with the housing 17 around the axis C—C as one body. When the third driving shaft 4 is rotated, the internal gear 1a provided on the inner periphery of the main body 1 is rotated, the fifth pinion 25 is thereby rotated around the pin 26, which is in turn rotated around the axis C—C at the same time, the third and fourth pinions 23 and 24 are thereby rotated around the pin 26 in synchronism with the fifth pinion 25, the first gear 11 and the fourth gear 15 are thereby rotated in synchronism with the rotation of the internal gear 1a, whereby the second gear 12 and the fifth gear 16 respectively engaging with the first and fourth gear 11 and 15 are rotated in synchronism with the main body 1. Accordingly the second gear 12 and the fifth gear 16 are not rotated around the axis A—A, since there exists no relative rotation between the main body 1 and the second gear 12 and the fifth gear 16 due to the synchronous rotation of the second and fifth gear 12 and 16 with respect to the main body 1. Consequently the driven shaft 14 is not forced to rotate around the axes A—A and B—B but just around the axis C—C.

In other words, the driven shaft 14 is rotated together with the housing 17 around the axis C—C with no relative rotation between the driven shaft 14 and the housing 17, and further in other words if the axis B—B and the axis C—C were on the the same line, being coaxial, it can be said that the driven shaft 14 is rotated around the axis B—B, however it is not rotated with respect to the housing 17.

In the above operation of the second embodiment, the transmission of the driving shafts 2, 3 and 4 are respectively and separately explained, however even when those shafts are rotated at the same time each rotation of the driving shafts is independently transmitted to rotate the driven shaft, in other words there exists no interference among those transmissions.

What we claim is:

1. A power transmission device used with an industrial manipulator comprising:
   a main body;
   a source of rotational force;
   a first driving shaft rotatably mounted in said main body and coupled to said source of rotational force;
   a second driving shaft rotatably mounted in said main body and coupled to said source of rotational force;
   a supporting shaft mounted in said main body;
   a first epicyclic differential gearing including,
   a first sun gear fixed to said supporting shaft,
   a first planet gear being in mesh with said first sun gear, and
   a first orbit gear rotatably mounted on said supporting shaft and being in mesh with said first planet gear, said first orbit gear being connected and driven by said first driving shaft to rotate about said supporting shaft;
   a second epicyclic differential gearing including,
   a second sun gear rotatably mounted on said supporting shaft,
   a second planet gear being in mesh with said second sun gear, and
   a second orbit gear rotatably mounted on said supporting shaft and being in mesh with said second planet gear, said second sun gear being connected to and driven by said second driving shaft to rotate about said supporting shaft,
   said first and second planet gears being connected by means of a pin and being independently rotatable about said pin;
   a housing mounted on said supporting shaft for limited pivotal rotation and connected to and driven by said first orbit gear to rotate about said supporting shaft, the rotation of said housing being less than 360°; and
   a driven shaft rotatably mounted in said housing and connected to and rotatively driven by said second orbit gear.

2. A power transmission device as claimed in claim 1, wherein said first driving shaft is rotatably mounted in said main body in parallel with said second driving shaft.

3. A power transmission device as claimed in claim 1, wherein said first driving shaft is coaxial with said second driving shaft.

4. A power transmission device as claimed in claim 1, wherein said supporting shaft falls at right angles with said driven shaft.

5. A power transmission device as claimed in claim 1, wherein said first and second epicyclic differential gearing are provided with gears having the same diametral pitch.

6. A power transmission device as claimed in claim 2, wherein said supporting shaft is disposed at right angles with said driven shaft.

7. A power transmission device as claimed in claim 2, wherein said first and second epicyclic differential gearing are provided with gears having the same diametral pitch.

8. A power transmission device used with an industrial manipulator comprising;
   a main body;
   a source of rotational force;
   a first driving shaft rotatably mounted in said main body and connected to said source of rotational force;
   a second driving shaft rotatably mounted in said main body and connected to said source of rotational force;
   a third driving shaft fixed to said main body and connected to said source of rotational force;
   a supporting axle mounted in said main body;
   a supporting shaft mounted in said main body;
   a first epicyclic differential gearing including,
   a first sun gear fixed to said supporting shaft,
   a first planet gear being in mesh with said first sun gear, and
   a first orbit gear rotatably mounted on said supporting shaft and being in mesh with said first planet gear;
   a second epicyclic differential gearing including,
   a second sun gear rotatably mounted on said supporting shaft,
   a second planet gear being in mesh with said second sun gear, and
   a second orbit gear rotatably mounted on said supporting shaft and being in mesh with said second planet gear,
   said first and second planet gears being connected by means of a first pin and being independently rotatable about said first pin;
   a third epicyclic differential gearing including,
   a third sun gear fixed to said first driving shaft,
   a third planet gear being in mesh with said third sun gear, and
   a third orbit gear rotatably mounted on said first driving shaft and being in mesh with said third planet gear, said third orbit gear being connected with said second sun gear by means of gear-engagement;
   a fourth epicyclic differential gearing including, a fourth sun gear fixed to said second driving shaft,
a fourth planet gear being in mesh with said fourth sun gear, and
a fourth orbit gear rotatably supported on said main body and being in mesh with said fourth planet gear, said fourth orbit gear being connected with said first orbit gear by means of gear engagement;
a fifth epicyclic differential gearing including,
a fifth sun gear fixed to said supporting axle,
a fifth planet gear being in mesh with said fifth sun gear, and
a fifth orbit gear fixed to said main body and being in mesh with said fifth planet gear,
said third, fourth and fifth planet gears being connected by means of a second pin and being independently rotatable about said second pin;
a housing rotatably mounted on said supporting shaft for limited pivotal rotation and connected to and driven by said first orbit gear to rotate about said supporting shaft, the rotation of said housing being less than 360°; and
a driven shaft rotatably mounted in said housing and connected to and rotatively driven by said second orbit gear.

9. A power transmission device as claimed in claim 8, wherein said first, second and third driving shaft are coaxial with one another.

10. A power transmission device as claimed in claim 9, wherein said first driving shaft runs through said second driving shaft.

11. A power transmission device as claimed in claim 9, wherein said second driving shaft runs through said supporting axle.

12. A power transmission device as claimed in claim 9, wherein said supporting axle runs through said third driving shaft.

13. A power transmission device as claimed in claim 8, wherein said driven shaft is disposed at right angles with said supporting shaft.

14. A power transmission device as claimed in claim 8, wherein said supporting shaft is disposed at right angles with said supporting axle.

15. A power transmission device as claimed in claim 8, wherein said first and second epicyclic differential gearing are provided with gears having the same diametral pitch.

16. A power transmission device as claimed in claim 8, wherein said third, fourth and fifth epicyclic differential gearing are provided with gears having the same diametral pitch.

* * * * *